United States Patent
Gulistan

(10) Patent No.: US 7,021,876 B2
(45) Date of Patent: Apr. 4, 2006

(54) SIMPLIFIED INSTALLATION CAPTIVE PANEL FASTENER

(76) Inventor: Bulent Gulistan, 20568 Pinnacle Way, Malibu, CA (US) 90265

( * ) Notice: Subject to any disclaimer, the term of this patent is extended or adjusted under 35 U.S.C. 154(b) by 17 days.

(21) Appl. No.: 10/652,120

(22) Filed: Aug. 28, 2003

(65) Prior Publication Data

US 2005/0047890 A1    Mar. 3, 2005

(51) Int. Cl.
*F16B 21/18* (2006.01)
(52) U.S. Cl. .................. 411/353; 411/105; 411/970; 411/999; 411/112
(58) Field of Classification Search ............... 411/353, 411/105, 970, 999, 112
See application file for complete search history.

(56) References Cited

U.S. PATENT DOCUMENTS

| | | | | |
|---|---|---|---|---|
| 3,765,465 A | * | 10/1973 | Gulistan | 411/353 |
| 3,995,675 A | * | 12/1976 | Cosenza | 411/353 |
| 4,655,658 A | | 4/1987 | Gulistan | |
| 4,747,738 A | * | 5/1988 | Duran | 411/353 |
| 4,793,757 A | * | 12/1988 | Peterson | 411/533 |
| 4,828,442 A | * | 5/1989 | Duran | 411/353 |
| 4,952,107 A | * | 8/1990 | Dupree | 411/103 |
| 4,963,063 A | * | 10/1990 | Gulistan | 411/105 |
| 4,975,007 A | * | 12/1990 | Molina | 411/107 |
| 5,073,070 A | * | 12/1991 | Chang | 411/353 |
| 5,372,055 A | * | 12/1994 | Kelly et al. | 81/53.2 |
| 5,374,140 A | * | 12/1994 | Standish et al. | 405/259.5 |

* cited by examiner

*Primary Examiner*—Katherine Mitchell
(74) *Attorney, Agent, or Firm*—Fulwider Patton LLP

(57) ABSTRACT

A simplified captive panel fastener including a head, shank, a threaded outer end, and a centrally threaded opening at the outer end. Longitudinal slots extend along the outer end of the fastener to receive a retention washer with inwardly extending prongs. The method of mounting the fastener to its desired location and locking a retention washer and fastener in place is easily performed by employing a tool which disposes the threaded mating part, for example, a screw or bolt, into the central threaded opening of the outer end of the fastener. The head of the screw or bolt has radial extent sufficient to block the slots and prevent loss of the retention washer. Only a common screwdriver is used to mount the retention screw or bolt in the end of the fastener.

11 Claims, 4 Drawing Sheets

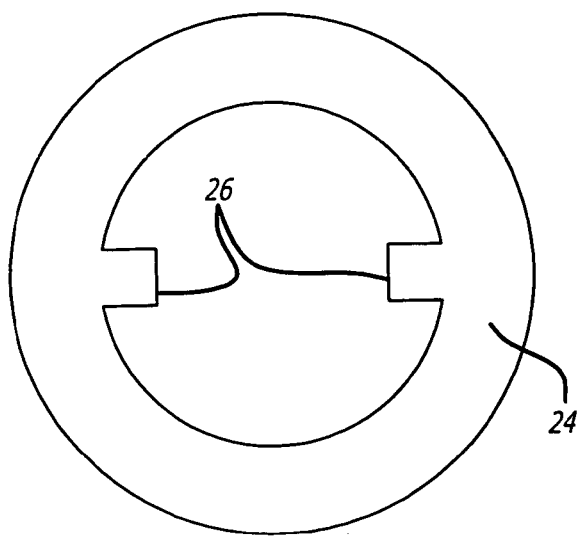
FIG. 2
(Prior Art)
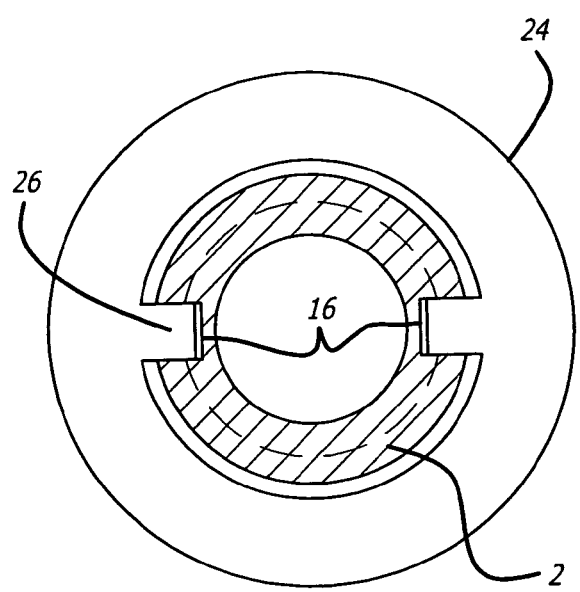
FIG. 3
(Prior Art)
FIG. 4
(Prior Art)
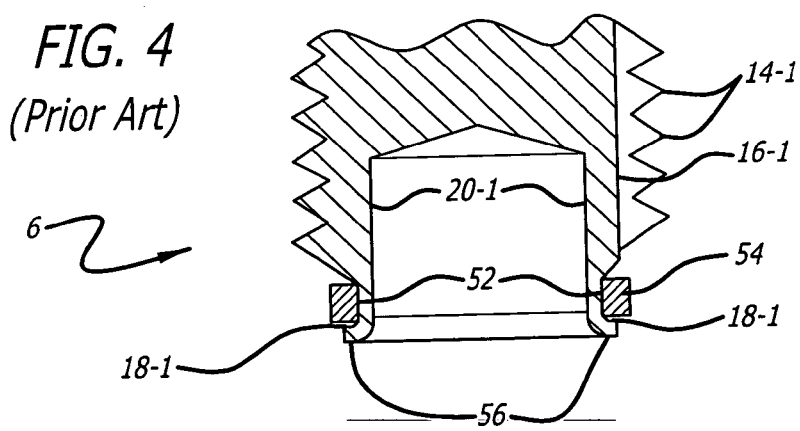

SIMPLIFIED INSTALLATION CAPTIVE PANEL FASTENER

FIELD OF THE INVENTION

This invention relates to captive panel fasteners, which can be readily replaced without special tooling, for example in field maintenance applications.

BACKGROUND OF THE INVENTION

U.S. Pat. No. 4,655,658 granted Apr. 7, 1987, inventor: B. Gulistan, is entitled Captive Panel Fastener. This patent discloses a fastener in which the abstract of the patent is useful in describing the fastener by way of background for the present invention. The abstract of the U.S. Pat. No. 4,655,658 will therefore be repeated here:

"A captive panel fastener includes a head, a shank and a threaded outer end, with slots extending longitudinally down through the threads toward the outer end of the fastener. A relatively rigid and inflexible retention washer is provided and this washer has inwardly extending prongs that fit into the longitudinally extending slots on the fastener. The outer end of the fastener has a hole in it, and after the washer is in place a forming tool is employed to deform the outer end wall of the opening so that the wall is pushed outwardly to block the outer ends of the longitudinally extending slots, thereby holding the washer onto the fastener, and retaining it extending through a hole in a panel or the like through which it may have been inserted. A small washer may be employed at the end of the fastener between the ends of the slots and the deformed extreme outer end of the fastener."

On occasion, for example when the threads of the fastener are damaged, it would be desirable to replace the fastener at a field maintenance location. However, the installation of the captive fastener as described above requires a special forming tool, to deform the outer end wall of the fastener to hold the retention washer in place. It is impractical to provide each field maintenance location with the required special forming tool, and accordingly the aircraft or other equipment using the fastener is often used with the damaged fastener; and replacement is not accomplished until the aircraft returns to a major maintenance location where the forming tool is available.

SUMMARY OF THE INVENTION

In accordance with the present invention the need for a replacement fastener, which could be installed with minimal or basic tools, was recognized; and the new replacement threaded fastener, which is simple to install, includes a head, a shank, and a threaded outer end with longitudinally extending slots in the threads of the fastener. In addition, at the outer end of the fastener, a hole is provided and this hole is tapped to provide internal threads. Further, a small retention screw is mounted in the threaded hole; and the head of the screw extends outward to a sufficient extent to hold the retention washer in place. In addition, the small retention screw may be provided with an anti-vibration capability, such as a NY LOCK® insert or plastic spray on the threads of either the retention screw or the threaded hole, so that the screw does not vibrate out of the assembly. Other known anti-vibration arrangements may be used.

The principal advantages of the new design is that the replacement captive fastener may be readily installed in the field, as the only tools required (if the threads on the original fastener are damaged for example) would be a pair of pliers and a screw driver. Thus, the old damaged fastener first is removed by bending the deformed end of the old fastener with a pair of pliers, so that the retention washer may be removed, thus freeing the damaged fastener for removal. The new replacement captive fastener is then inserted in place without the small retention screw, the retention washer is slid onto the grooved threaded main fastener and then the retention screw is threaded into the end of the main fastener, locking the retention washer in place, and completing the retrofit. Subsequently, a nut or other internally threaded mating fastener part is threaded onto the exposed threaded outer end of the captive fastener. Of course, every field maintenance location will at least have pliers and screwdrivers available, so the retrofit may be accomplished without the need for any special tooling such as the forming tool disclosed in the U.S. Pat. No. 4,655,658.

Other objects, features and advantages of the invention will become apparent from a consideration of the following detailed description and the accompanying drawings.

BRIEF DESCRIPTION OF THE DRAWINGS

FIG. 2 is a plan view illustrating the teachings of one example of a washer (U.S. Pat. No. 4,655,658 to Gulistan).

FIG. 3 is a cross-sectional view illustrating the teachings of the prior art construction, showing a washer with inwardly extending prongs fitting into the longitudinally extended slots on the fastener (U.S. Pat. No. 4,655,658 to Gulistan).

FIG. 4 is a partial cross-sectional view showing an alternative embodiment of the prior art using a small supplemental washer (U.S. Pat. No. 4,655,658 to Gulistan).

DETAILED DESCRIPTION OF THE PREFERRED EMBODIMENTS

While the specification describes particular embodiments of the present invention, those of ordinary skill can devise variations of the present invention without departing from the inventive concept.

Figure 1:
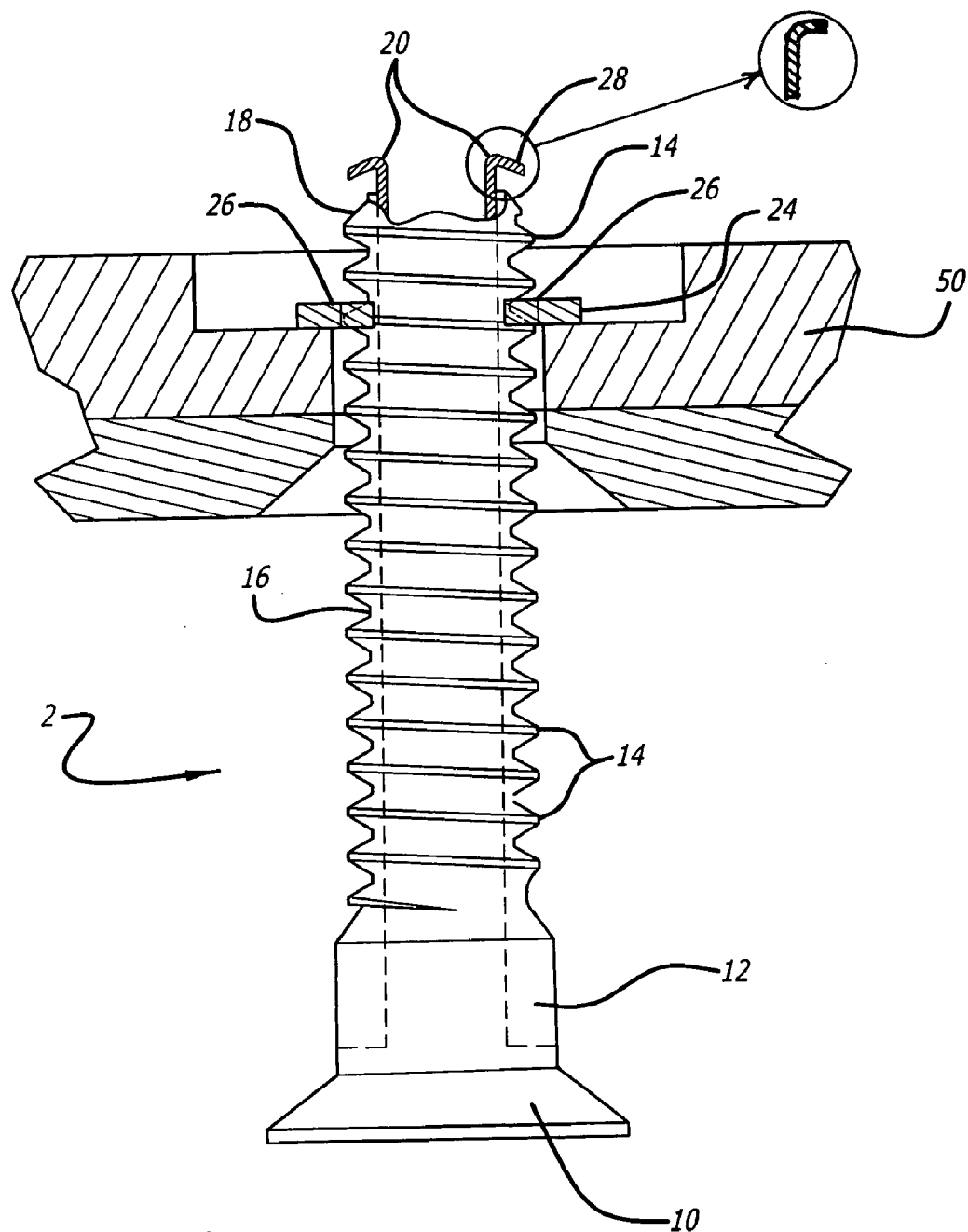
FIG. 1 is a cross-sectional view through a threaded fastener and retaining washer, illustrating the teachings in the prior art (U.S. Pat. No. 4,655,658 to Bulent Gulistan).

Referring more particularly to the drawings, FIGS. 1, 2, 3 and 4 are illustrative of the teachings of the captive panel fasteners of the prior art of Gulistan '658. FIG. 1 shows a captive panel fastener 2 illustrating the principles of the prior art in U.S. Pat. No. 4,655,658 to Gulistan (Gulistan '658). The fastener 2 of Gulistan '658 has a head 10, a shank 12 and an outer threaded end 14 with a central opening 20. The fastener 2 has a plurality of slots 16 along the length of the fastener 2. Essentially, in Gulistan '658, once the fastener 2 is mounted in its desired location or panel 50 and the retention washer 24, with its inwardly extending prongs 26 fining into the longitudinal slots 16 (see FIG. 2) of the fastener 2, is in place, the formable end wall 28 located at the tip of the outer end 18 of the fastener 2 is deformed using the plunger tool of Gulistan '658 (refer to FIG. 4 of that patent). The action of the plunger tool of Gulistan '658 is to bend and deform the formable end wall 28 of the fastener 2 such that it blocks the outer ends 18 of the slots 16 and prevents the washer 24 from sliding off or from being removed from the fastener 2.

FIG. 2 shows an example of a washer 24 with inwardly extending prongs 26 for fitting into the longitudinal slots 16 of the fastener 2. FIG. 3 is a cross-sectional view of the outer end 18 of the fastener 2 with a washer 24 in place.

FIG. 4 shows an alternative end configuration 6 of the fastener 2 of FIG. 1, wherein the fastener including the threads 14-1, the opening 20-1 and other features of the assembled captive panel fastener 2 including a retention washer 24 are substantially as shown in FIGS. 1, 2 and 3. However, in FIG. 4, the outermost end portion of the fastener 18-1 is initially reduced to a diameter 52 slightly less than twice the radial distance from the center of the fastener 2 to the bottom of the slots 16-1. Also the outer diameter of the washer 54 in FIG. 4 and the outwardly deformed formable end wall 28 in FIGS. 1 and 56 in FIG. 4 are preferably about equal to the root of diameter of the threads to avoid interference with a nut to be threaded to fastener 2.

Figure 5:
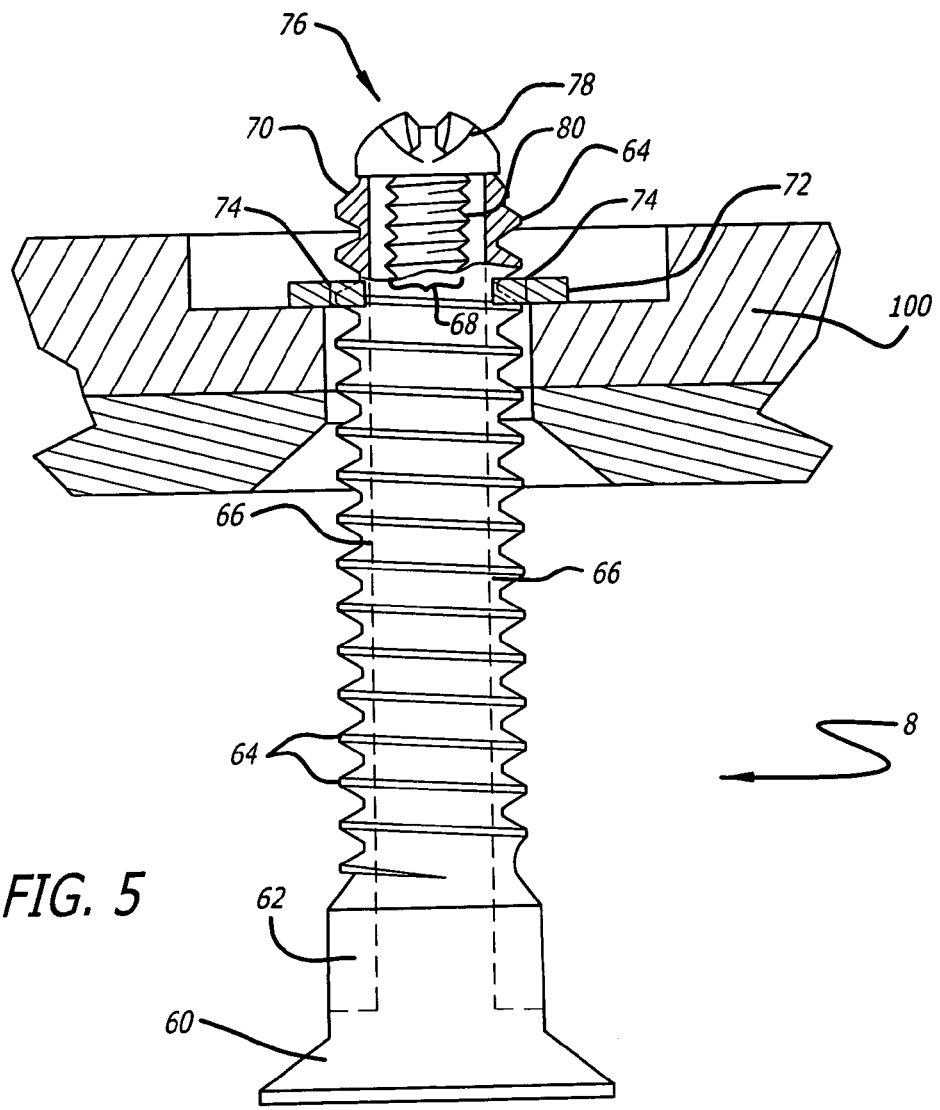
FIG. 5 is a cross-sectional view through a threaded fastener and retaining washer, the outer end of the threaded fastener containing a tapped central opening with internal threads for receiving of a retention screw, illustrative of the present invention.

FIG. 5 is illustrative of the present invention. The present invention is simplified over the invention of Gulistan '658 because unlike Gulistan '658, which employed a special hand tool to deform the formable end wall 28 of the fastener 2, the present invention uses common, basic tools (i.e. screwdriver) to accomplish the same goal. A special hand tool to deform the formable end wall 28 of the fastener 2 is not practical out in the field where common, basic tools such as screwdrivers and pliers are readily available. Therefore, the present invention (see FIG. 5 description below) modifies the prior art of Gulistan '658 to incorporate the usage of these common tools to repair and/or install the fastener 8 and/or washer 72 and/or other captive parts fastened by the captive panel fastener 8.

FIG. 5 shows a different captive panel fastener 8 from that of the fastener 2 in Gulistan '658 (see FIG. 1-4). The captive panel fastener 8 of FIG. 5 does not require a special deforming device as that described in Gulistan '658 (see FIG. 4). FIG. 5, shows the fastener 8 having a head 60, a shank 62, a threaded outer end 64, longitudinal slots 66 along the length of the threaded outer end 64 of the fastener 8, and a central threaded opening 68. The fastener 8 is mounted through a panel 100 and the retaining washer 72 is mounted with its inwardly extending prongs 74 extending into the longitudinal slots 66 of the fastener 8. FIG. 5 also shows the threaded outer end 80 of the mating screw 76 mounted into the central threaded opening 68 of the fastener 8. The head 78 of the mating screw 76 blocks the slots 66, either directly or indirectly, and prevents the retention washer 72 from sliding off the outer end 70 of the fastener 8.

The captive panel fastener 8 of the present invention does not require a special deforming hand tool as that described Gulistan '658 (see FIG. 4) because the action of the plunger tool of Gulistan '658 was to bend and deform the formable end wall 28 of the fastener 2 such that it blocks the outer end portion 18 and prevents the washer 24 from sliding off or from being removed from the fastener 2. The present invention requires no special deforming tool; rather the present invention relies on the head 78 of the screw or bolt 76 to prevent the washer 72 from sliding off the outer end portion 70 of the fastener 8.

Figure 6A:
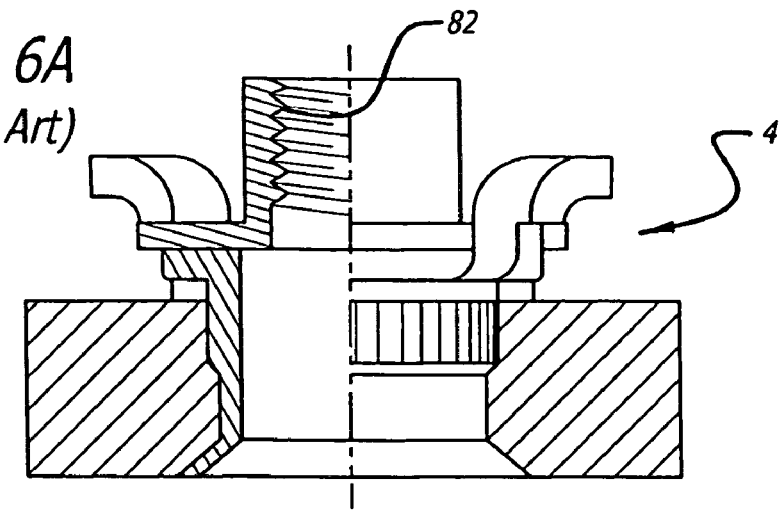
FIG. 6A is a view of a floating nut assembly of the prior art and FIG. 6B is a view of a fastener of the present invention with which the floating nut assembly can be employed.
Figure 6B:
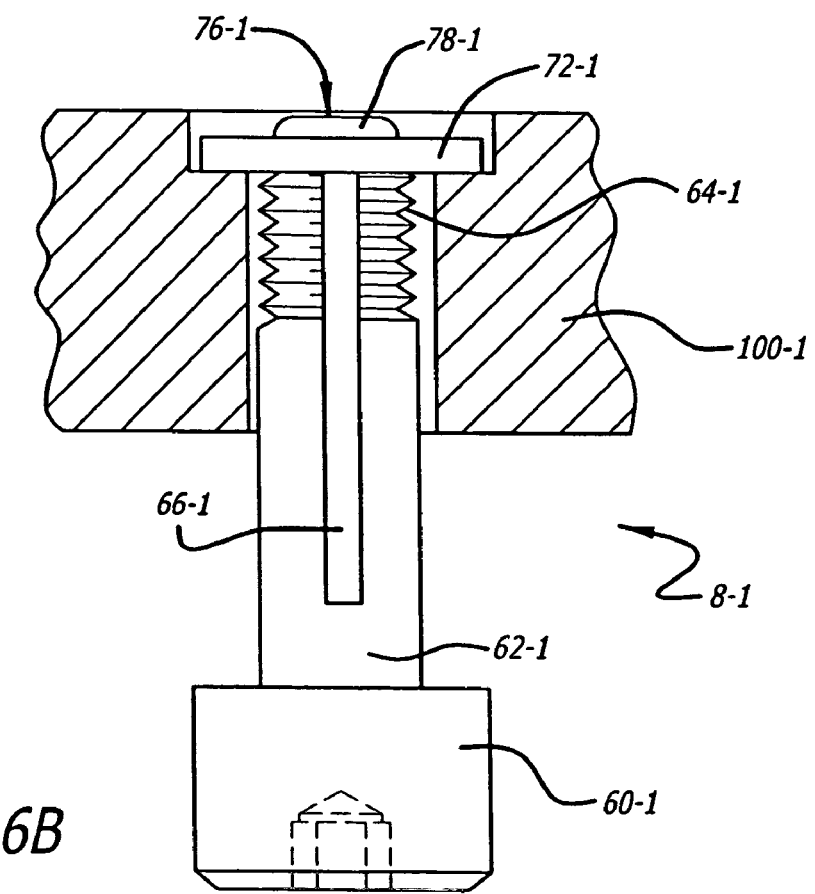

FIG. 6A is a view of the known prior art floating nut assembly 4 to be employed with a fastener 8 of the type of the present invention shown in FIG. 6B. FIGS. 6A and 6B are placed together in the drawing to illustrate assembly of a complete fastener. FIG. 6B is illustrative of the type of fastener 8 of the present invention substantially as shown in FIG. 5 but with a different head 60-1. FIG. 6B shows a fastener 8-1 with its head 60-1, shank 62-1, threaded outer end 64-1 and longitudinal slots 66-1. The central threaded opening 68 and the threaded outer end 80 of the screw or bolt 76-1 are not shown. The head 78-1 of the threaded screw 76-1 is shown mounted into the central threaded opening 68 of the fastener 8-1 (details not shown in FIG. 6B). The fastener 8-1 is mounted through a panel 100-1. The retaining washer 72-1 with its inwardly extending prongs 74 (not shown in FIG. 6B) fits into the longitudinally extending slots 66-1 of the fastener 8-1 substantially as shown in FIG. 5. In FIG. 6B, the only tool that is used to assemble the captive panel fastener 8-1 in its desired location is a screwdriver to mount the screw 76-1 into the central threaded opening 68 of the fastener 8-1. The threads 82 of the floating nut assembly 4 mate with the threads 64-1 at the outer end of the fastener 8-1 when the fastener 8-1 is finally tightened in place. Instead of the floating nut assembly 4, simple hexagonal nut with optional washers may be employed.

Figure 7:
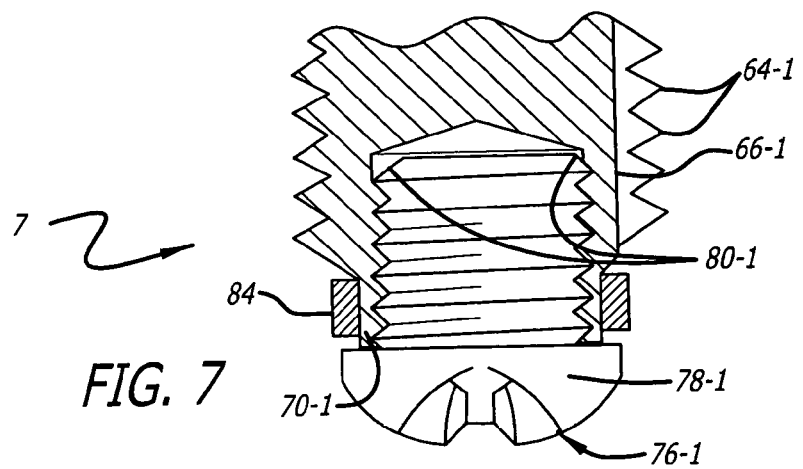
FIG. 7 is a partial cross-sectional view showing an alternative embodiment of the invention using a small supplemental washer around an unthreaded region of the outer end of the fastener.

FIG. 7 shows an alternative end configuration 7 of the type of fastener shown in FIG. 5, wherein the fastener 8' includes the threads 64-1 and the opening 80-1. Other features of the assembled captive panel fastener 8' including a retention washer 72 are substantially as shown in FIGS. 5 and 6B. However, in FIG. 7, the outermost end portion 70-1 of the fastener 8' is unthreaded and the small washer 84 blocks the slots 66-1 and prevents the loss of the retention washer 72 (not shown in FIG. 7). The small washer 84 is held in place by the outer rim of the head 78-1 of the screw 76-1.

In accordance with one aspect of the present invention, a method of installing a captive panel fastener 8 of the present invention comprises mounting the fastener 8 to its desired location. The retention washer 72, with its inwardly extending prongs 74, is the slid onto the fastener 8 and fits into the longitudinally extended slots 66 of the fastener 8. To block the washer 72 from sliding off the fastener 8, a threaded screw or bolt 76 is mounted into the central threaded opening 68 of the fastener 8 using a screwdriver. The screwdriver or tool employed depends on the head of the screw or bolt 78 mounted into the central threaded opening 68 of the fastener 8. The screw or bolt 76 contains a head 78 with a radial extent sufficient to block the slots 66 and prevent loss of the retention washer 72. Note that only a screwdriver is used to assemble the captive panel fastener 8, whereas assembly of the fastener 2 of the prior art requires a special deforming hand tool (see FIG. 4 of Gulistan '658).

In another aspect of the present invention, if in the field there is a need to repair or replace a damaged fastener 8 of the type described in FIG. 5 and FIG. 6B, the damaged parts are easily replaced by unscrewing the screw or bolt 76 from the central threaded opening 68 of the outer end 70 of the fastener 8. Removing the screw or bolt 76 allows both the retention washer 72 and the fastener 8 to be taken out of the panel 100. A new fastener 8 is mounted and another or the same retention washer 72 is slid into place and prevented from sliding off by mounting a screw or bolt 76 as described above. In the case of a damaged fastener of the type shown in FIG. 1, the fastener 2 may be removed using pliers to bend the deformed end 28 inwardly, to permit removal of the retention washer 24 and fastener 2; and a new captive panel fastener as shown in FIG. 5 may be installed.

In another embodiment of the present invention, any threaded screw or bolt 76 can be installed and used to prevent both the fastener 8 and the retention washer 72 from sliding off. The head 78 of the screw or bolt 76 should have a radial extent sufficient to block the slots 66 and prevent loss of the retention washer 72. Alternatively, the retention screw or bolt 76 may be a self-tapping screw or bolt.

In another aspect of the present invention, the fastener 8 including a head 60, a shank 62, an externally threaded outer end 64 and a centrally threaded opening 68 may be substantially as described in FIGS. 5 and 6B, except in this embodiment (see FIG. 7), the outer end portion 70-1 of the fastener 8 is unthreaded; and the head 78-1 of the retention screw or bolt 76-1 holds the washer 84 in place. Accordingly, the head 78-1 of the retention screw or bolt 76-1 may either directly block the lower end of the slots 66-1, or may do so indirectly by holding the washer 84 in place.

Preferably, the retention screw or bolt 76 may be provided with an anti-vibration capability to avoid loosening in the presence of vibration. For example, a NYLOCK® insert or another type of plastic insert can be placed into the outer threaded end 80 of the screw or bolt 76. Alternatively, a plastic spray can be sprayed on the threads of either the retention screw or bolt 76 or the threaded central opening 68. Other known anti-vibration arrangements may also be used.

In conclusion, it is to be understood that the foregoing detailed description and accompanying drawings relate to one or more embodiments of the invention. Other alternative arrangements may be employed without departing from the spirit and scope of the invention. Thus, for example, the number of slots 66 on the fastener 8 is variable and is dependent on the fastener 8 application. In another example, the extent of the external 64 and internal threads 68 of the fastener 8 will also depend on the fastener 8 application. Further, the depth of the central threaded opening 68 of the outer end of the fastener 70 is at least equal to or greater than the length of the threaded outer end 80 of the threaded mating screw or bolt 76 that is installed. Also, any suitable tool can be used to remove a damaged captive panel fastener 8. Accordingly, it is to be understood the detailed description and the drawings as set forth hereinabove are for illustrative purposes only, and do not constitute a limitation on the scope of the invention.

I claim:

1. A captive panel fastener assembly comprising:
   a) a fastener having a head at a proximal end, a shank extending distally from the head, and an externally threaded portion extending distally from said shank, said externally threaded portion having external threads and having a distal unthreaded end portion;
   b) the shank having an outer diameter comparable to or greater than the outer diameter of the threaded portion of the fastener;
   c) the distal end of the fastener having a central opening, the opening having inwardly extending threads;
   d) the shank of the fastener and the threaded portion having a plurality of longitudinally extending slots each having a radially inner bottom and an open distal end;
   e) a first washer having radially inwardly extending prongs for fitting into the longitudinally extending slots, the first washer being relatively inflexible;
   f) a retention mating screw or bolt having a head at a proximal end and a threaded portion extending distally from the head threadably mounted into the threaded central opening, the head of the retention mating screw or bolt having a diameter substantially less than a radially outer diameter of the external threads of the fastener; and
   g) a small second washer having an outer diameter greater than a diameter formed by the bottom of the slots, the small second washer being retained on the distal unthreaded end portion of the fastener by the head of the retention mating screw or bolt between the open distal ends of the slots and the head of the retention mating screw or bolt, wherein the head of the retention mating screw or bolt removably blocks the open distal ends of the slots indirectly by holding the small second washer in place, and removably retains the first washer onto the fastener by preventing the prongs of the first washer from sliding off the distal unthreaded end of the fastener, to thereby hold the fastener captive in a desired location.

2. The captive panel fastener as defined in claim 1 wherein the shank has a diameter less than the outer diameter of the first washer.

3. The captive panel fastener as defined in claim 1 wherein the fastener has only two slots and wherein the first washer has two corresponding radially inwardly directed prongs.

4. The captive panel fastener as defined in claim 1 wherein the depth of the threaded central opening has a length that is equal or greater than the length of the threaded portion of the retention mating screw or bolt mounted into the central opening.

5. A captive panel fastener assembly comprising:
   a) a fastener having a head at a proximal end, a shank extending distally from the head, the shank including a threaded portion with external threads and an unthreaded reduced diameter distal end portion, and a central inwardly directed opening at a distal end portion;
   b) the shank having a plurality of longitudinally extending slots extending through the threads on the threaded portion of the fastener, each of the slots having a radially inner bottom and an open distal end;
   c) a retention washer having radially inwardly extending prongs for fitting into the longitudinally extending slots;
   d) a retention screw or bolt having a head at a proximal end and a threaded portion extending distally from the head threadably mounted into the central opening; and
   e) a small washer having an outer diameter greater than a diameter formed by the bottom of the slots, the small washer being retained on the distal unthreaded reduced diameter end portion of the threaded portion of the shank by the head of the retention screw or bolt between the open distal ends of the slots and the head of the retention screw or bolt, wherein the head of the retention screw or bolt removably blocks the open distal ends of the slots indirectly by holding the small washer in place, and removably retains the retention washer onto the fastener by preventing the retention washer prongs from sliding off the unthreaded distal end portion of the shank, to thereby hold the fastener captive in a desired location.

6. The captive panel fastener as defined in claim 5 wherein the shank has a diameter comparable to or greater than the outer diameter of the external threads of the fastener.

7. The captive panel fastener as defined in claim 5 wherein the fastener has only two slots and wherein the retention washer has two correspondingly radially inwardly directed prongs.

8. The captive panel fastener as defined in claim 5 wherein clearance is provided at the distal end of the fastener, whereby the retention washer may readily slide over the distal end of the fastener into the slots, prior to mounting of the retention screw or bolt into the threaded central opening.

9. A method for providing a captive panel fastener in place comprising the steps of:
   a) fabricating a fastener having a head at a proximal end and a threaded portion extending distally from the head, the threaded portion having a plurality of longitudinally extending slots each having a radially inner bottom end and an open distal end, the threaded portion of the fastener having a distal unthreaded end portion and a central threaded opening;
   b) mounting the fastener in a desired captive location;
   c) sliding a retention washer having radially inwardly extending prongs to fit closely into the longitudinally extending slots with the retention washer extending around the fastener;
   d) assembling a small washer onto the distal unthreaded end portion of the fastener to block the open distal ends of the slots; and e) threadably mounting a retention screw or bolt into the central threaded opening of the fastener, the retention screw or bolt having a head and external threads, the head having a diameter or outward extent to block the slots, but not interfere with threading a nut onto the fastener, whereby threadably mounting the retention screw or bolt removably blocks the ends of the slots indirectly by holding the small washer in place.

10. The method of providing a captive panel fastener in place as defined in claim 9 wherein the diameter of the head of the retention screw or bolt is substantially greater than a diameter formed by the bottom of the slots.

11. The method of providing a captive panel fastener in place as defined in claim 9 comprising the additional step of threading a nut onto the threaded portion of the fastener.

* * * * *